(12) United States Patent
Kellam et al.

(10) Patent No.: US 7,000,909 B2
(45) Date of Patent: Feb. 21, 2006

(54) PLASTIC BEARING, PARTICULARLY FOR USE IN MACPHERSON STRUT

(76) Inventors: David M. Kellam, 122 Elizabeth Street, Stratford, Ontario (CA) N5A 4Z3; Alex Teng, 831 Capulet Lane, London, Ontario (CA) N6H 5V2; Michael Claassen, 75365 Peters Drive, Romeo, MI (US) 48065

( * ) Notice: Subject to any disclaimer, the term of this patent is extended or adjusted under 35 U.S.C. 154(b) by 0 days.

(21) Appl. No.: 10/742,002

(22) Filed: Dec. 19, 2003

(65) Prior Publication Data

US 2004/0130115 A1 Jul. 8, 2004

Related U.S. Application Data

(60) Provisional application No. 60/435,978, filed on Dec. 20, 2002.

(51) Int. Cl.
*F16F 9/00* (2006.01)
*B60G 15/07* (2006.01)
*F16C 17/10* (2006.01)
*F16C 17/04* (2006.01)

(52) U.S. Cl. ............................. 267/221; 280/124.155; 384/228; 384/241; 384/424

(58) Field of Classification Search ................ 267/219, 267/220, 221; 280/124, 155; 384/228, 241, 384/420, 422, 424, 302, 303, 590, 606, 322, 384/368
See application file for complete search history.

(56) References Cited

U.S. PATENT DOCUMENTS

| | | | | |
|---|---|---|---|---|
| 4,854,745 A | * | 8/1989 | Kamimura et al. | 384/420 |
| 4,969,752 A | * | 11/1990 | Kubota et al. | 384/420 |
| 5,476,326 A | * | 12/1995 | Ueno et al. | 384/125 |

FOREIGN PATENT DOCUMENTS

| | | | | |
|---|---|---|---|---|
| JP | 07279948 A | * | 10/1995 | |
| JP | 10122223 A | * | 5/1998 | |
| JP | 10122233 A | * | 5/1998 | |
| JP | 11013767 A | * | 1/1999 | |
| JP | 2003214425 A | * | 7/2003 | |
| JP | 2003269458 A | * | 9/2003 | |
| JP | 2004176728 A | * | 6/2004 | |
| JP | 2004239379 A | * | 8/2004 | |
| WO | WO 2004070220 A1 | * | 8/2004 | |

* cited by examiner

*Primary Examiner*—Thomas Williams
(74) *Attorney, Agent, or Firm*—Ostrolenk, Faber, Gerb & Soffen, LLP

(57) ABSTRACT

A MacPherson strut tube having an upper spring seat, a spring, a strut tube, and a ring bearing disposed for engaging the spring seat, the spring and the strut tube. The ring bearing comprises an upper casing, a lower casing, and a plastic ring engaged between the upper and lower casings, thereby forming said ring bearing.

30 Claims, 16 Drawing Sheets

PLASTIC BEARING, PARTICULARLY FOR USE IN MACPHERSON STRUT

CROSS-REFERENCE TO RELATED APPLICATION

This application is based upon and claims priority of U.S. provisional application Ser. No. 60/435,978, filed Dec. 20, 2002, the disclosure of which is incorporated by reference herein.

BACKGROUND OF THE INVENTION

1. Field of the Invention

The invention relates to a ring bearing for use in a MacPherson strut, and more particularly to a ring bearing made of plastic.

2. Background Art

As shown in FIG. 1, a MacPherson strut assembly has a strut tube 5, and a lower spring seat 4 welded to the stint tube 5. A spring 6 is positioned directly on the spring seat 4, or may be seated in a rubber dampener which is positioned on the spring seat 4. The latter reduces the road vibration transmitted from the wheels. The upper end of the spring 6 is held by the upper spring seat 1 which can also utilize a rubber dampening medium 3. A bearing 2 is captured in the upper spring seat 1 and keeps the upper seat 1 concentric to the strut tube 5. The upper seat 1 is interference fitted into the bore of the bearing 2.

An example of a known bearing 2 is described in detail in connection with FIG. 2. It supports the loads which are transferred through the spring 4 in a dual path arrangement and supports the loads from the spring 4 and strut tube 5 in a single path system.

The bearing 2 (FIG. 2) comprises upper and lower plastic casings 8 and 9. The arm extensions 8a, 8b, 8c, 8d, 9a, 9b provide a sealing function and on one side (8d) a locking feature. A set of balls 10 ride on two hardened steel raceways 11a, 11b. The raceways may be shaped corresponding to the curvature of the balls 10, or may be stamped in approximately a Gothic arch shape, for example. The latter shape provides for axial and radial load-carrying capacity. It also eliminates side movement in the bearing, which eliminates the fouling of the upper and lower plastic casings.

Another known bearing 2a (FIG. 3) is comprised of an upper hardened steel raceway 12 which is stamped to form an angular contact bearing 2a. A set of balls 10 are held by a lower hardened steel raceway 13 which is covered partially in rubber 14. The rubber 14 provides a sealing function on the inner and outer surfaces. An inner lip 15 of the lower raceway 13 seats into a groove 16 in the upper raceway 12. This locks the bearing 2a together.

As described above, the known designs utilize steel balls in associated steel raceways. The raceways and balls are held in place and protected from contamination by upper and lower plastic casings, which lock together by the use of angled lips or extensions which can be on both the outer and inner portions of the upper and lower casings.

Despite the general success of these designs, there is a continuing need to reduce the manufacturing cost of the bearing and the weight of the bearing assembly, without altering its overall size.

SUMMARY OF THE INVENTION

According to several forms of the invention shown herein, a bearing comprises a plastic chain with elongated sections forming the load-carrying members. The links between the sections are reduced in cross-section and allow for limited bending when the load is applied in use.

In one embodiment of the invention, the sections are designed to carry a pure axial load which is perpendicular to the bearing top surface. The bearing provides a point contact as seen in cross-section. The bearing surfaces of the upper and lower casings are preferably mirror images of each other.

The sections are profiled to permit the carrying of grease to lubricate the sliding surfaces during operation.

The weight of the bearing is reduced while maintaining the fitting diameters prescribed by the mating components. The rolling action of the balls is replaced by a sliding action, which may advantageously be between two dissimilar plastic chemistries.

In a second embodiment, the sections are designed to carry the load over a defined angle. The bearing operates as an arc-contact bearing. This bearing reduces sideways travel of the casings and possibly squeaking and vibration.

According to a third embodiment, further improvement is obtained with a four-arc contact bearing.

In a fourth embodiment, the sections are designed to carry the load over a defined angle. This bearing operates as a combination of a line-contact bearing and an arc-contact bearing.

A fifth embodiment is designed to carry the load over a defined angle and operates as a four-point contact bearing.

A sixth embodiment is designed to carry the load over a defined angle and operates as a taper-line-contact bearing.

Other features and advantages of the present invention will become apparent from the following description of several embodiments of the invention which refers to the accompanying drawings.

DETAILED DESCRIPTION OF EMBODIMENTS OF THE INVENTION

First Embodiment—Point Contact Bearing

Figure 1:
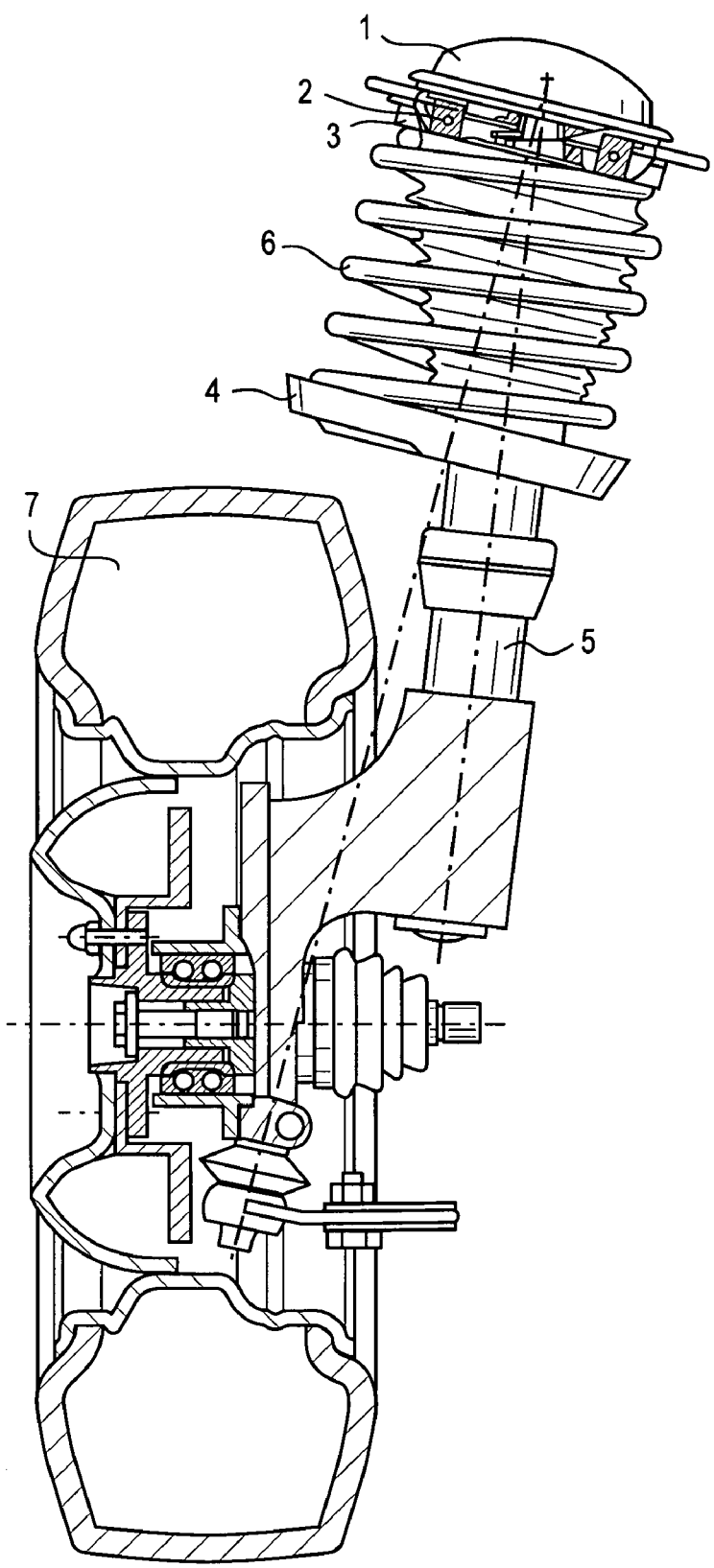
FIG. 1 is an elevation, partly in cross-section, of a prior art MacPherson strut.
Figure 2:
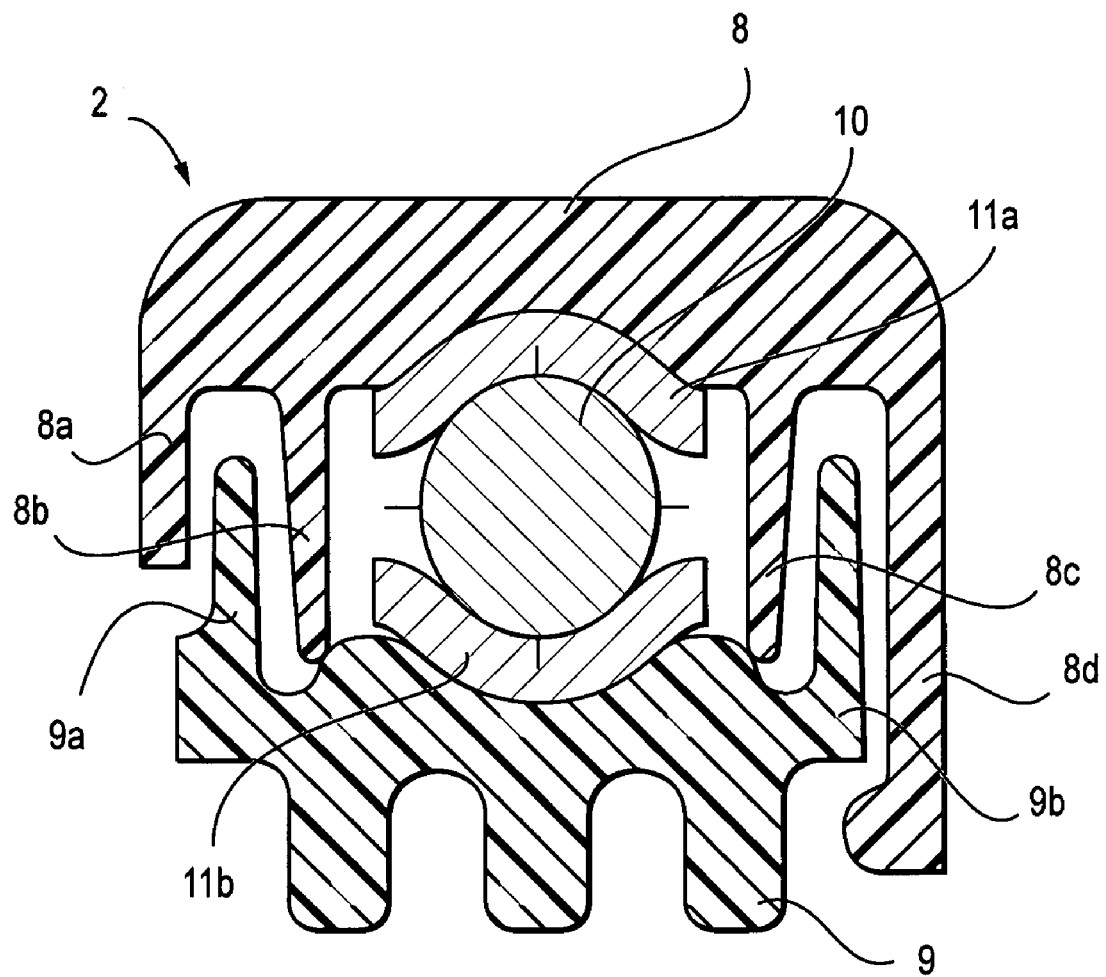
FIG. 2 is a cross-section of a prior art bearing.
Figure 3:
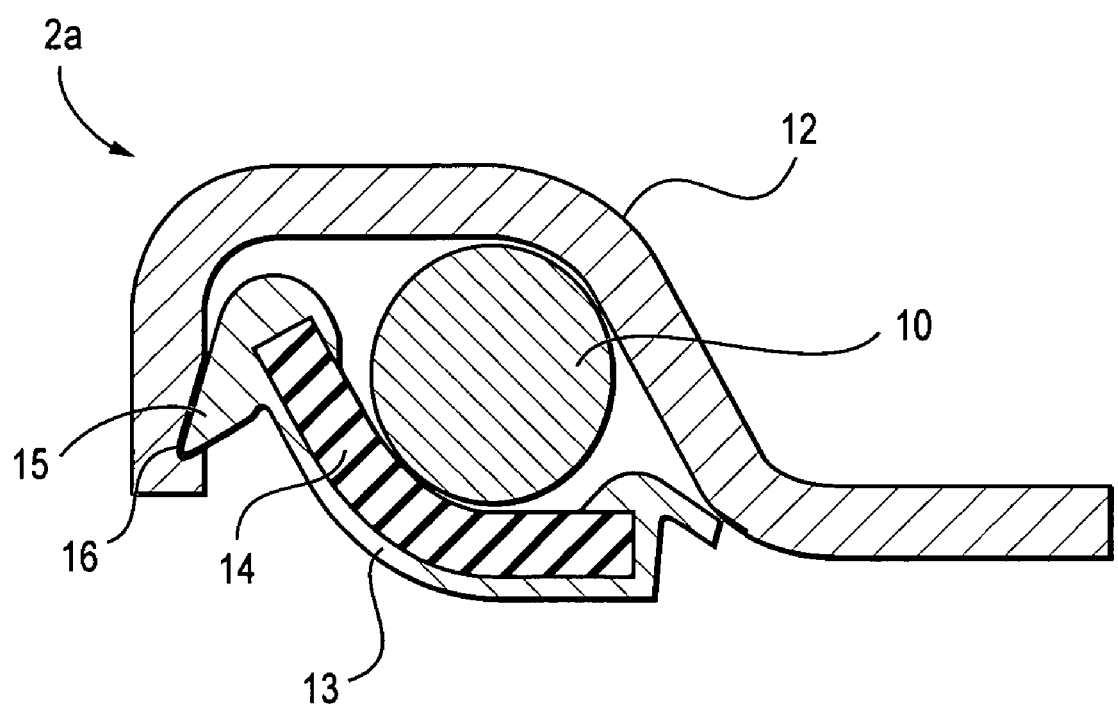
FIG. 3 is a cross-section of a second prior art bearing.
Figure 4:
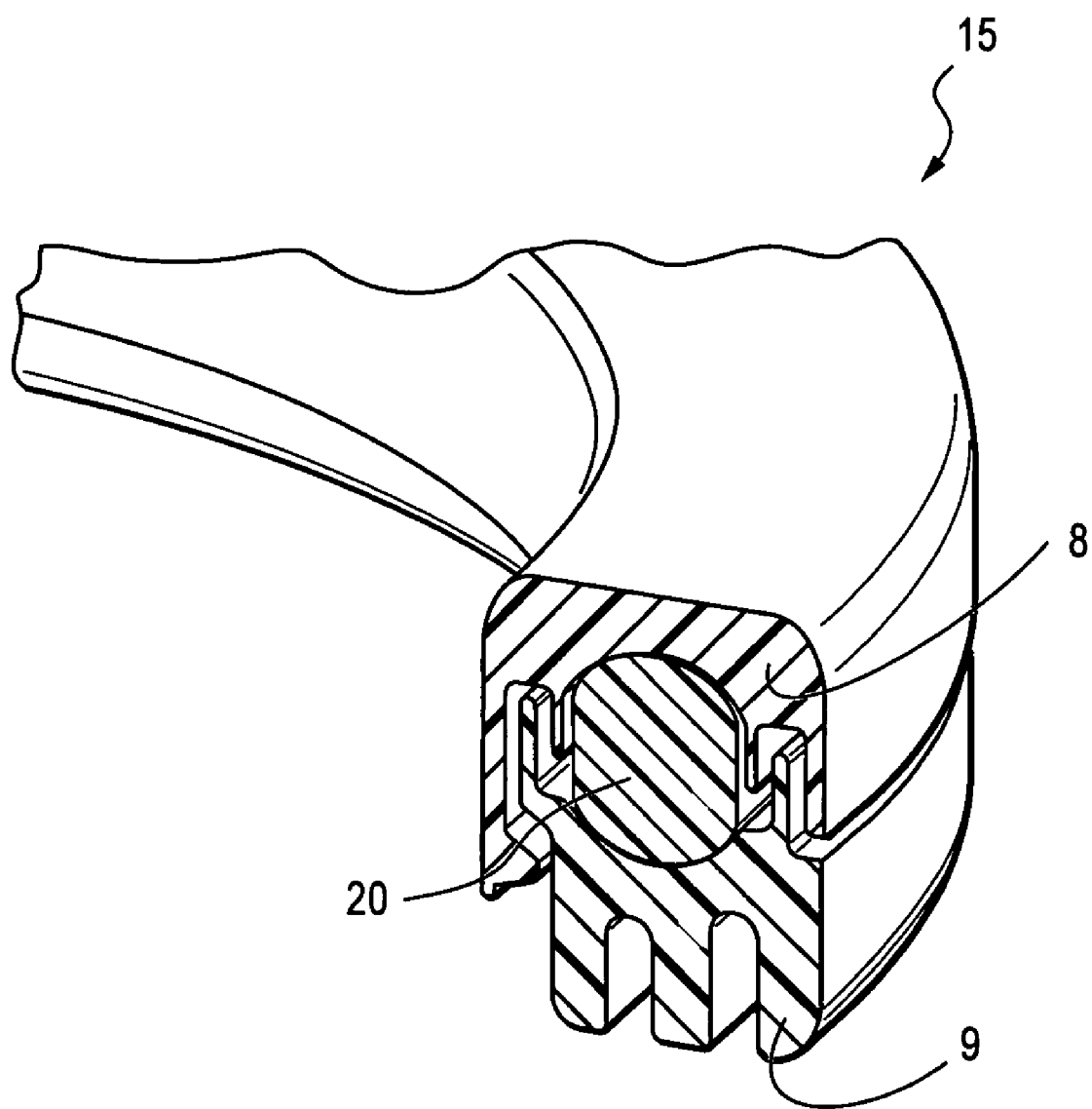
FIGS. 4 and 5 show a first embodiment of the invention, in a partially broken-away perspective view and a partial cross-section.
Figure 5:
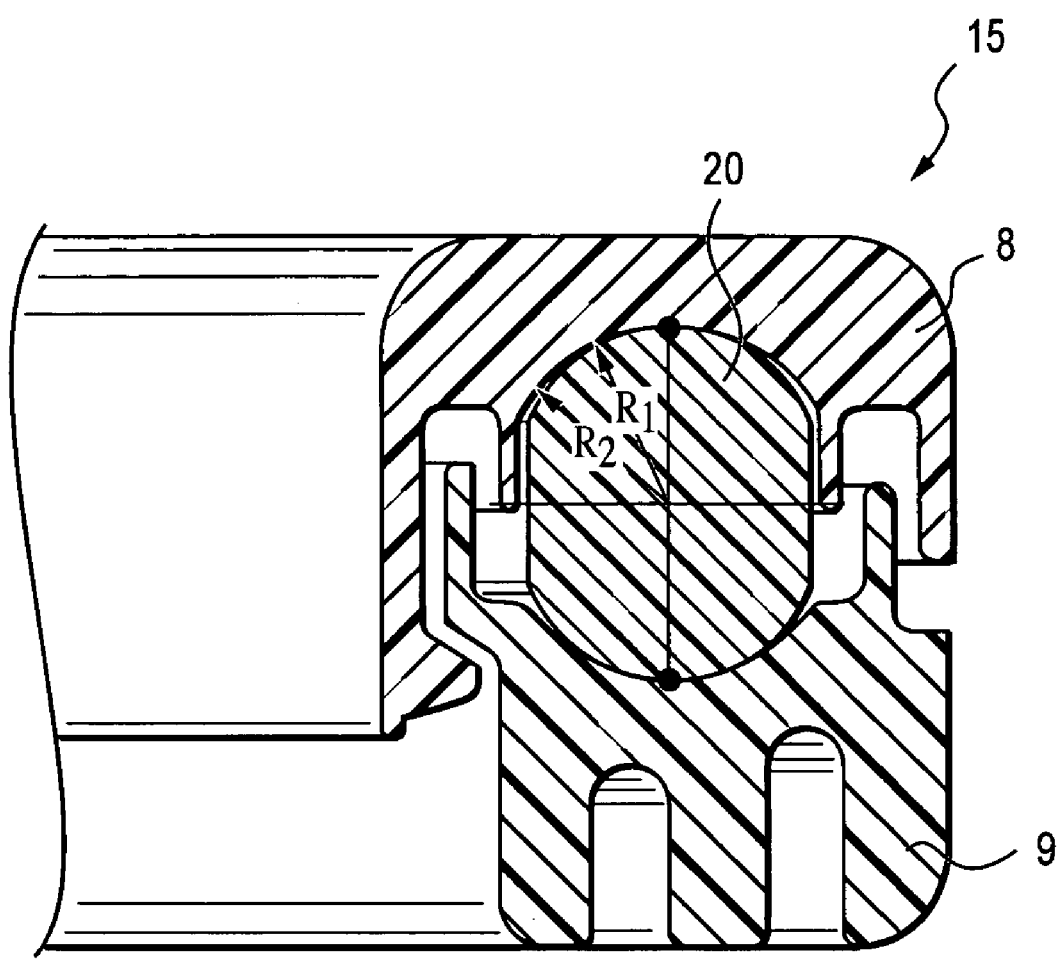

The bearing 15 is depicted in FIGS. 4 and 5. It may have the same strut bearing upper casing 8 (plastic cap) and lower casing 9 (plastic base) as in FIGS. 1–2. The prior art steel raceways 11a, 11b and rolling elements 10 have been replaced by a plastic ring 20. The ring 20 is profiled to establish a point contact bearing which is capable of supporting axial load. The upper and lower casings 8 and 9 and the plastic ring 20 each have a single radius. The radius of the upper and lower casings is $R_2$ while the radius of the ring 20 is $R_1$, wherein $R_1 < R_2$.

Figure 12:
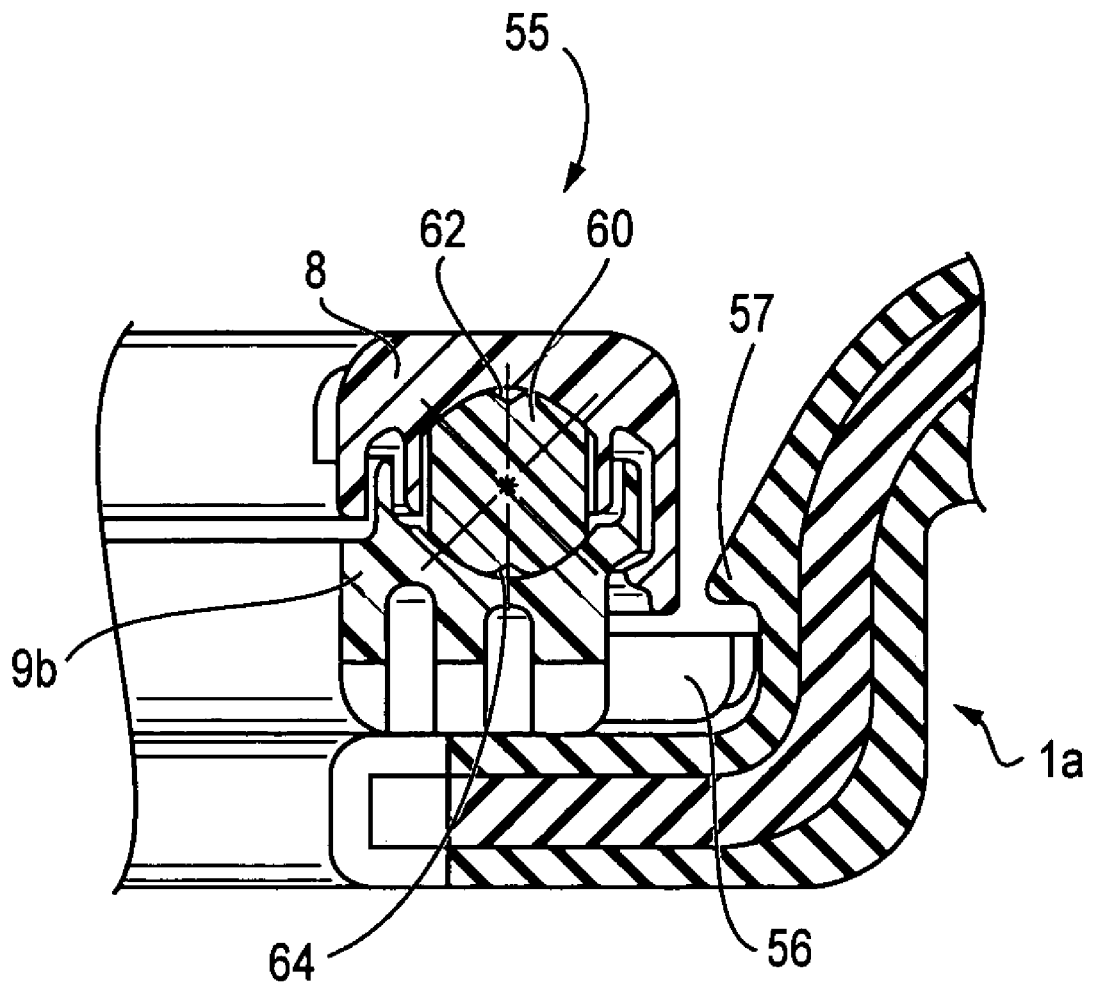
FIGS. 12, 13 and 14 show a fifth embodiment of the invention, FIG. 12 being a partial cross-section, FIGS. 13 and 14 being partly broken-away perspective views.
Figure 13:
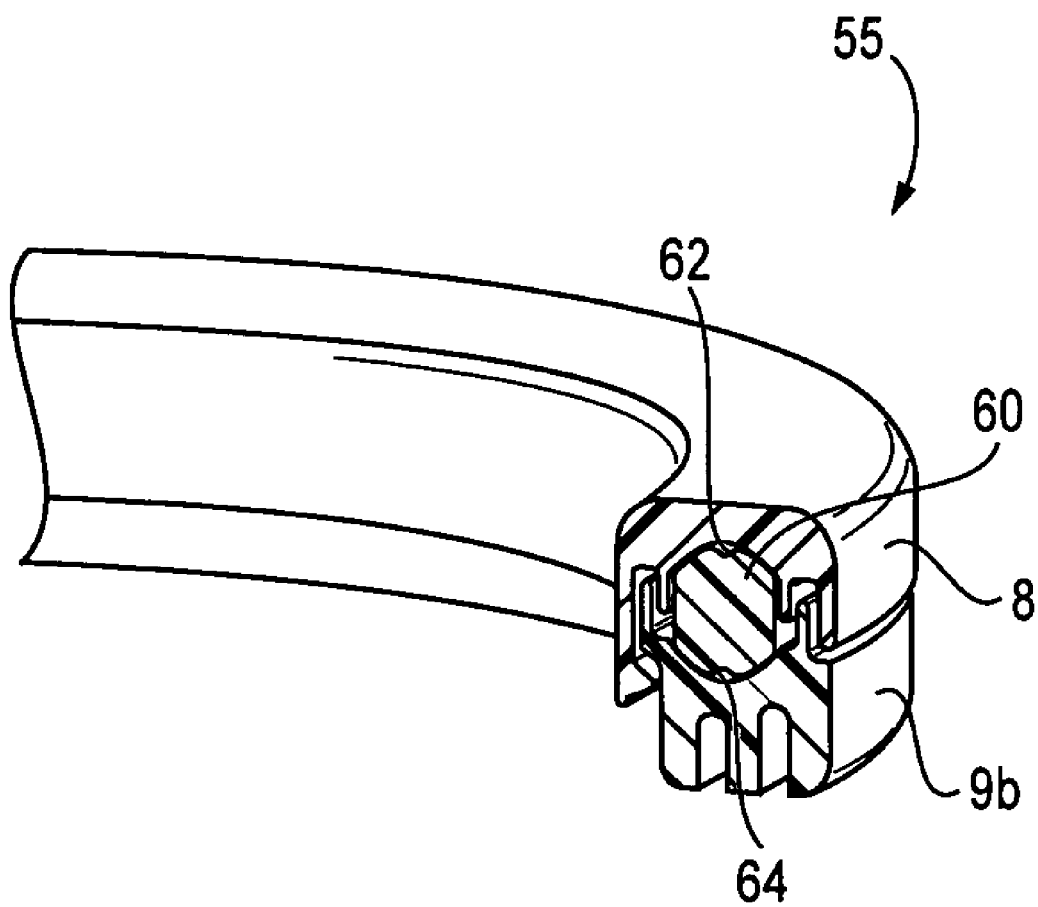
Figure 14:
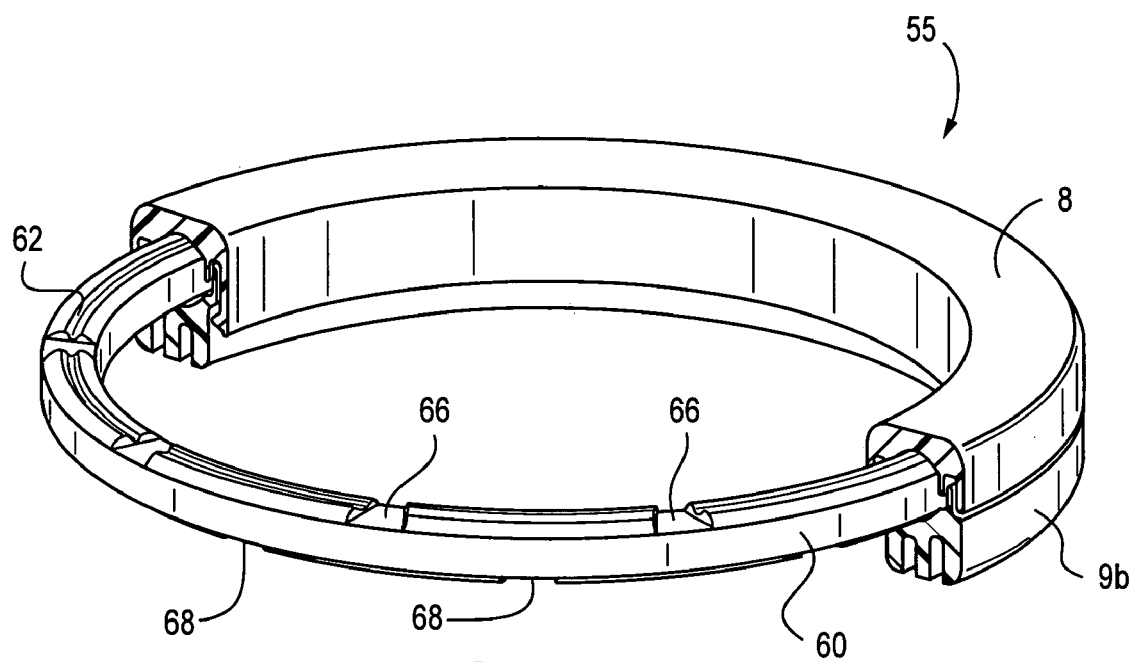

The ring also may have longitudinal grooves in its top and bottom surfaces as seen for example in FIGS. 12–14, which would eliminate contact at the central point where the ring 20 meets the upper and lower casings. This would reduce the friction of the assembly.

The ring also may have recesses in its top and bottom sides again as seen for example in FIGS. 12–14, which are used to carry lubrication. The lubrication reduces friction and aids in the sealing of the bearing for improved lifetime. The design is economical due to the elimination of steel raceways and balls.

The radius of the plastic ring and the upper/lower casing (i.e. $R_1$ and $R_2$) can be adjusted according to the required load capacity. The weight of the bearing is reduced while maintaining the fitting diameters prescribed by the mating components. The rolling action of the balls is replaced by a sliding action which may be between two dissimilar plastic chemistries. The retained lubricant supplies sealing and continued lubrication through the life of the bearing.

Second Embodiment—Arc-Contact Bearing

Figure 6:
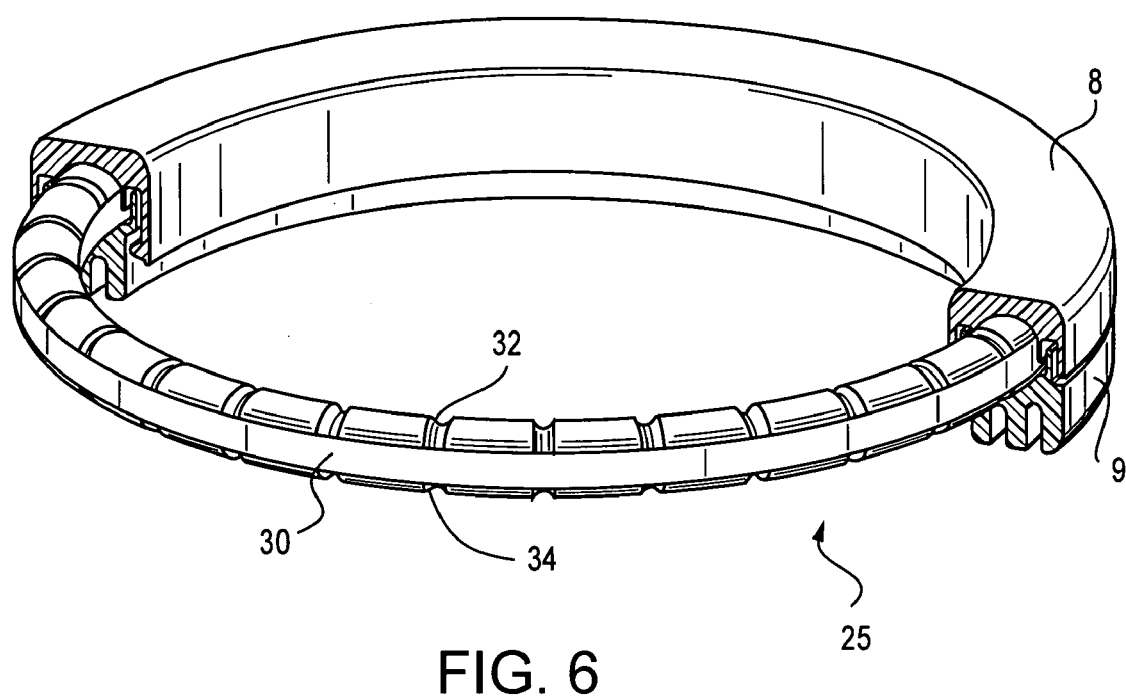
FIGS. 6 and 7 show a second embodiment of the invention, in a partially broken-away perspective view and a partial cross-section.
Figure 7:
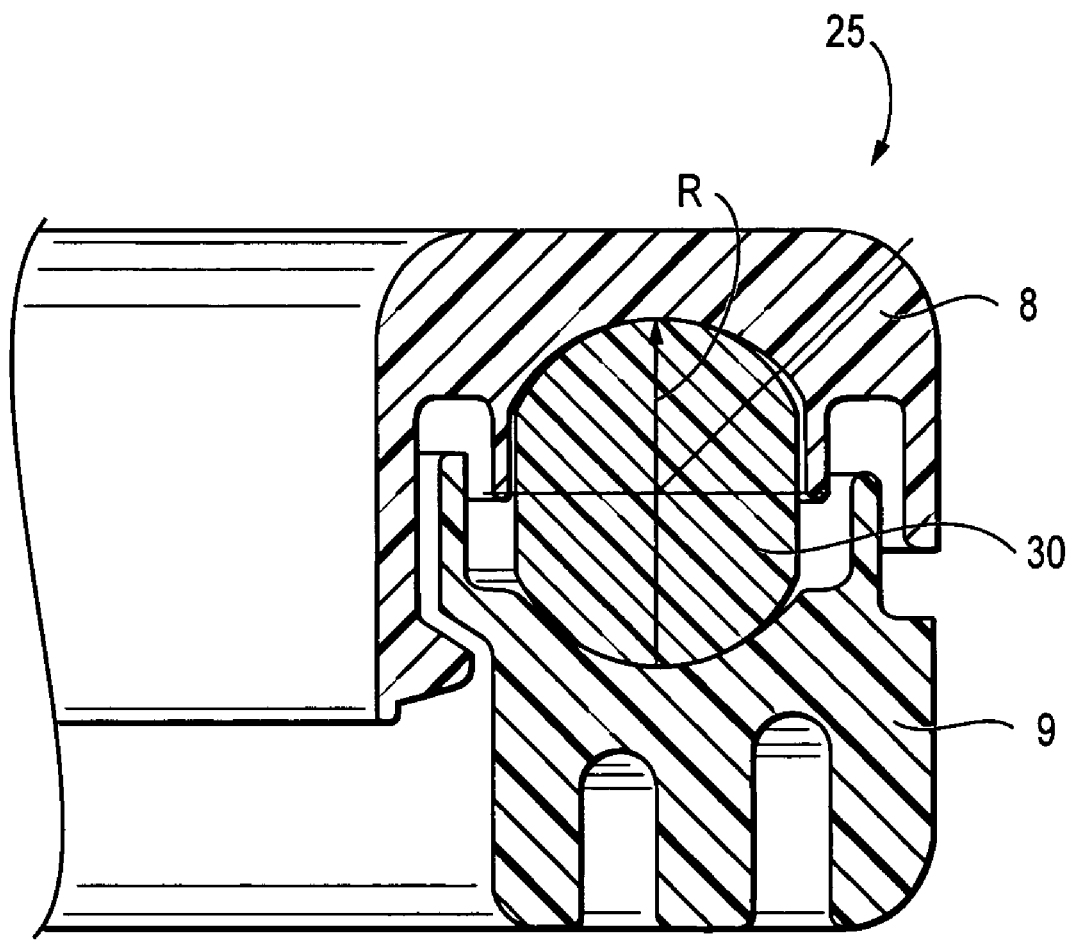

The second embodiment of a bearing 25 is depicted in FIGS. 6 and 7, FIG. 6 being a partly broken-away perspective view and FIG. 7 being a partial cross-section. It has the same strut bearing upper casing (plastic cap) 8 and lower casing (plastic base) 9 as in FIGS. 4–5. The prior art steel raceways and rolling elements have been replaced by a plastic ring 30. Said ring 30 is profiled to establish an arc-contact bearing which is capable of supporting radial and axial loads. A contact interface of single radius R is formed between the upper and lower casings and the plastic ring 30.

The ring may have central longitudinal grooves at its top and bottom surfaces as seen for example in FIGS. 12–14 to eliminate contact where the ring meets the arches of the upper and lower casings. This feature would keep the friction of the assembly low.

The ring 30 also has recesses 32, 34 on its top and bottom sides which are used to carry lubrication. Said lubrication reduces friction and aids in the sealing of the bearing for improved lifetime.

An economical design is achieved due to the elimination of steel raceways and balls. The prior art weight of the bearing is reduced while maintaining the fitting diameters prescribed by the mating components. The rolling action of the balls is replaced by a sliding action, which may be between two dissimilar plastic chemistries. The retained lubricant supplies sealing and continued lubrication through the life of the bearing.

Third Embodiment

Figure 8:
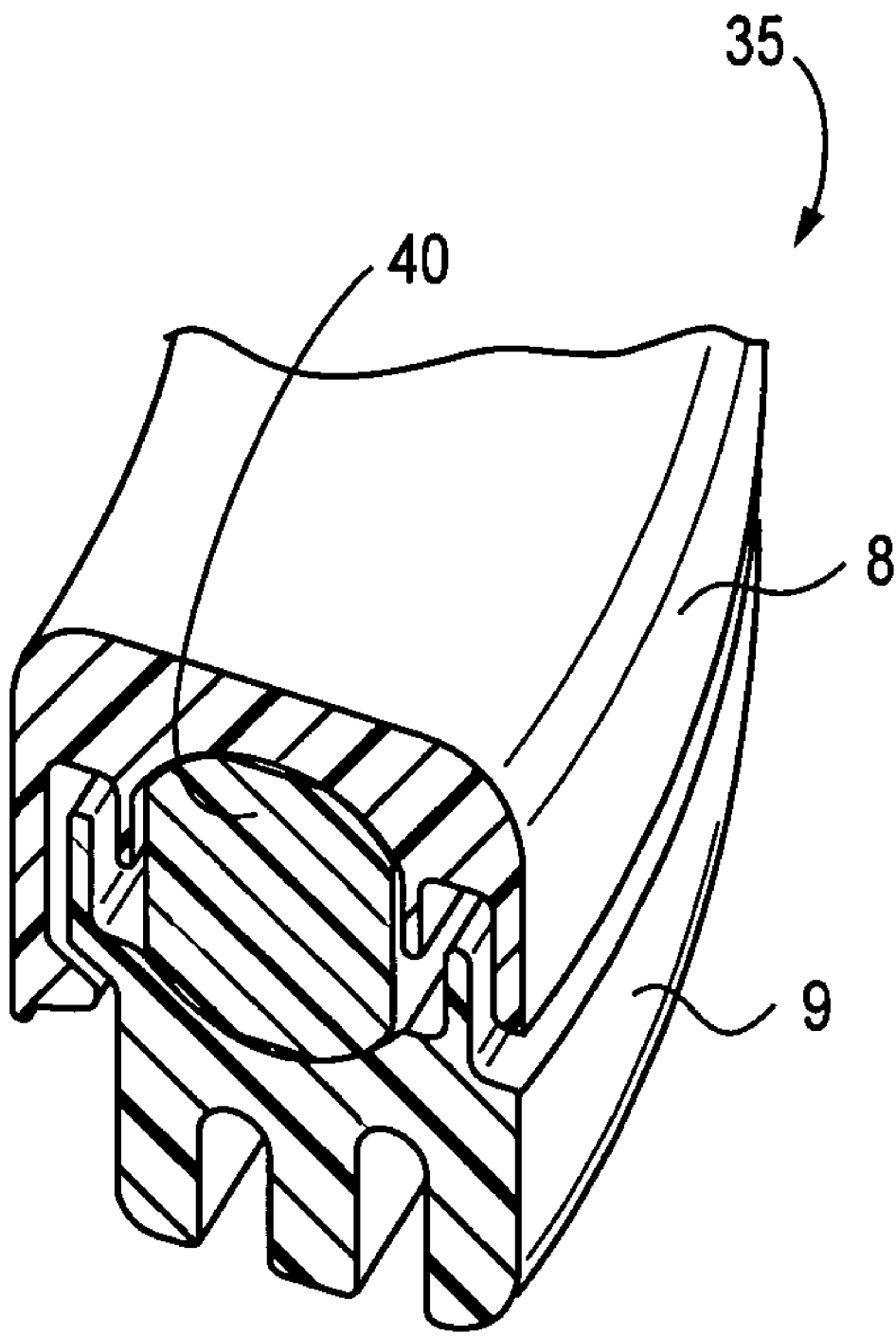
FIGS. 8 and 9 show a third embodiment of the invention, in a partially broken-away perspective view and a partial cross-section.
Figure 9:
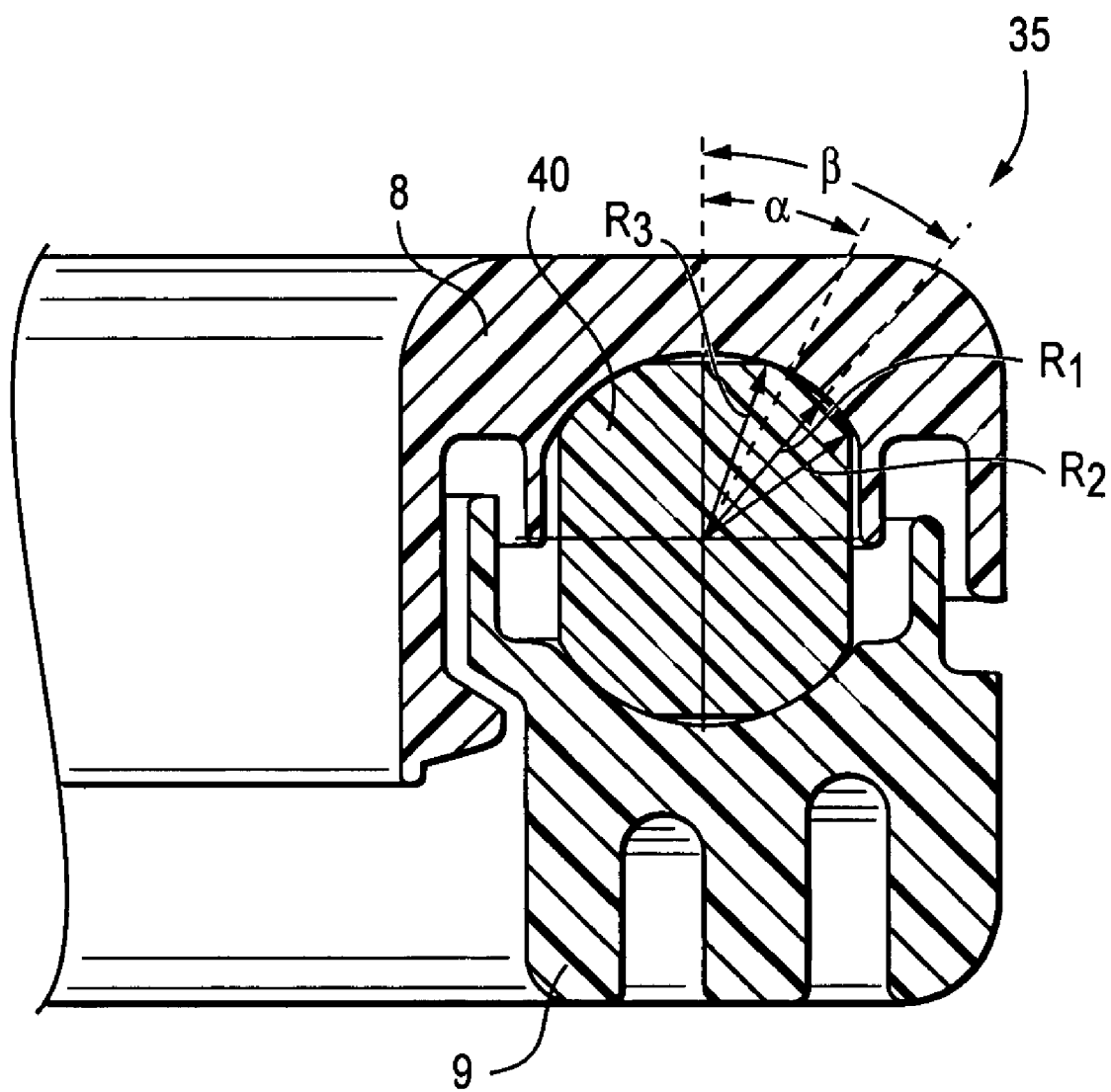

Another arc-contact bearing 35 is depicted in FIGS. 8 and 9. It has the same strut bearing upper casing (plastic cap) 8 and lower casing (plastic base) 9 as in FIGS. 4–5. The prior art steel raceways and rolling elements have been replaced by a plastic ring 40. Said ring is profiled to establish a four-arc contact bearing which is capable of supporting radial and axial loads. Contact between the ring 40 and the upper and lower casings 8 and 9 is provided by both the ring and the casings having a single radius $R_1$, over an angular range defined by $\alpha <$ contact angle $< \beta$.

The ring 40 also has flattened top and bottom surfaces, leaving spaces between the top and bottom of the ring and the upper and lower casings. The ring also may have longitudinal grooves in its top and bottom surfaces as seen for example in FIGS. 12–14. These arrangements eliminate central contact where the ring meets the upper and lower casings, keeping the friction of the assembly low.

The ring also has recesses on its top and bottom sides, again as seen for example in FIGS. 12–14, which are used to carry lubrication. Said lubrication reduces friction and aids in the sealing of the bearing for improved lifetime.

The design is economical achieved due to the elimination of steel raceways and balls. The parameters (i.e. $R_1$, $R_2$, $R_3$, $\alpha$ and $\beta$) can be adjusted to achieve the required axial and radial load capacity. The weight of the bearing is reduced while maintaining the fitting diameters prescribed by the mating components. The rolling action of the balls is replaced by a sliding action, which may be between two dissimilar plastic chemistries. The retained lubricant supplies sealing and continued lubrication through the life of the bearing.

Fourth Embodiment—Line/Arc Contact Bearing

Figure 10:
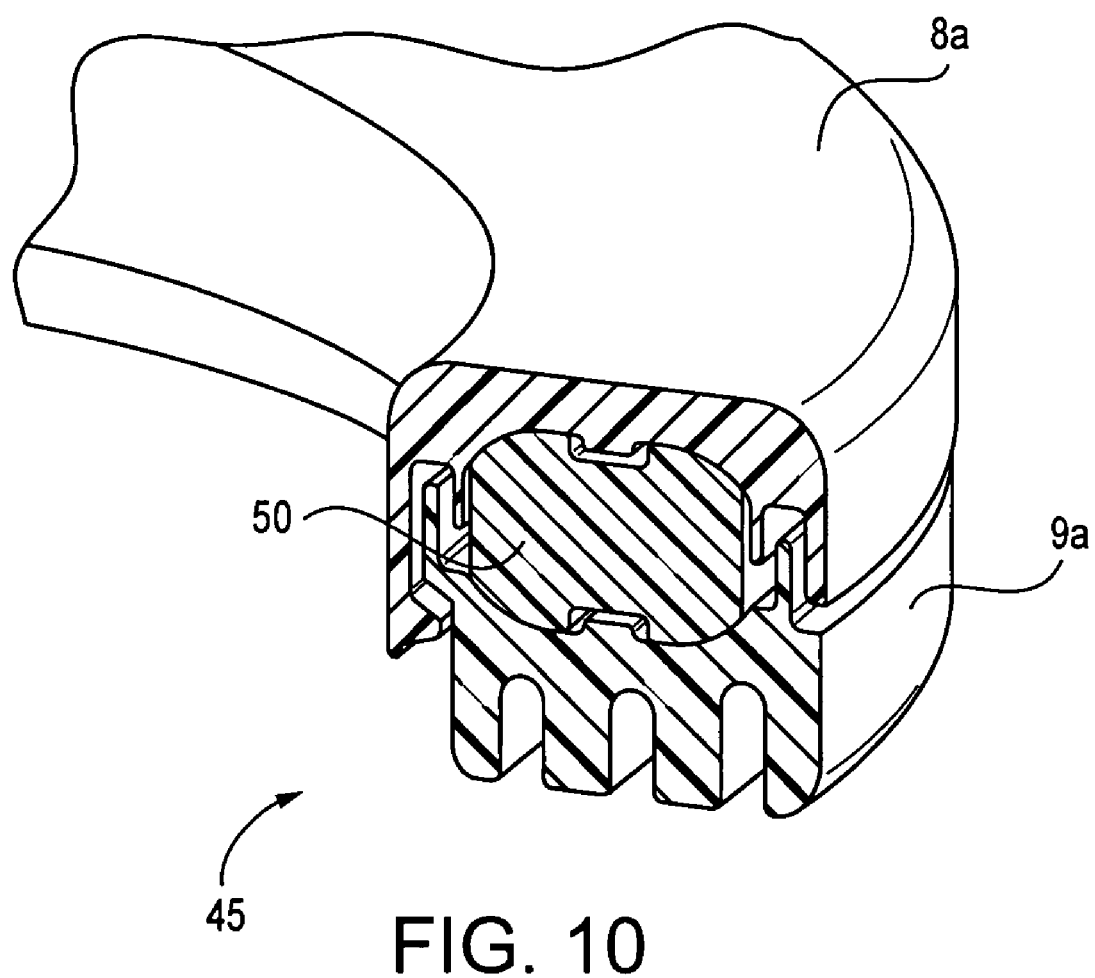
FIGS. 10 and 11 show a fourth embodiment of the invention, in a partially broken-away perspective view and a partial cross-section.
Figure 11:
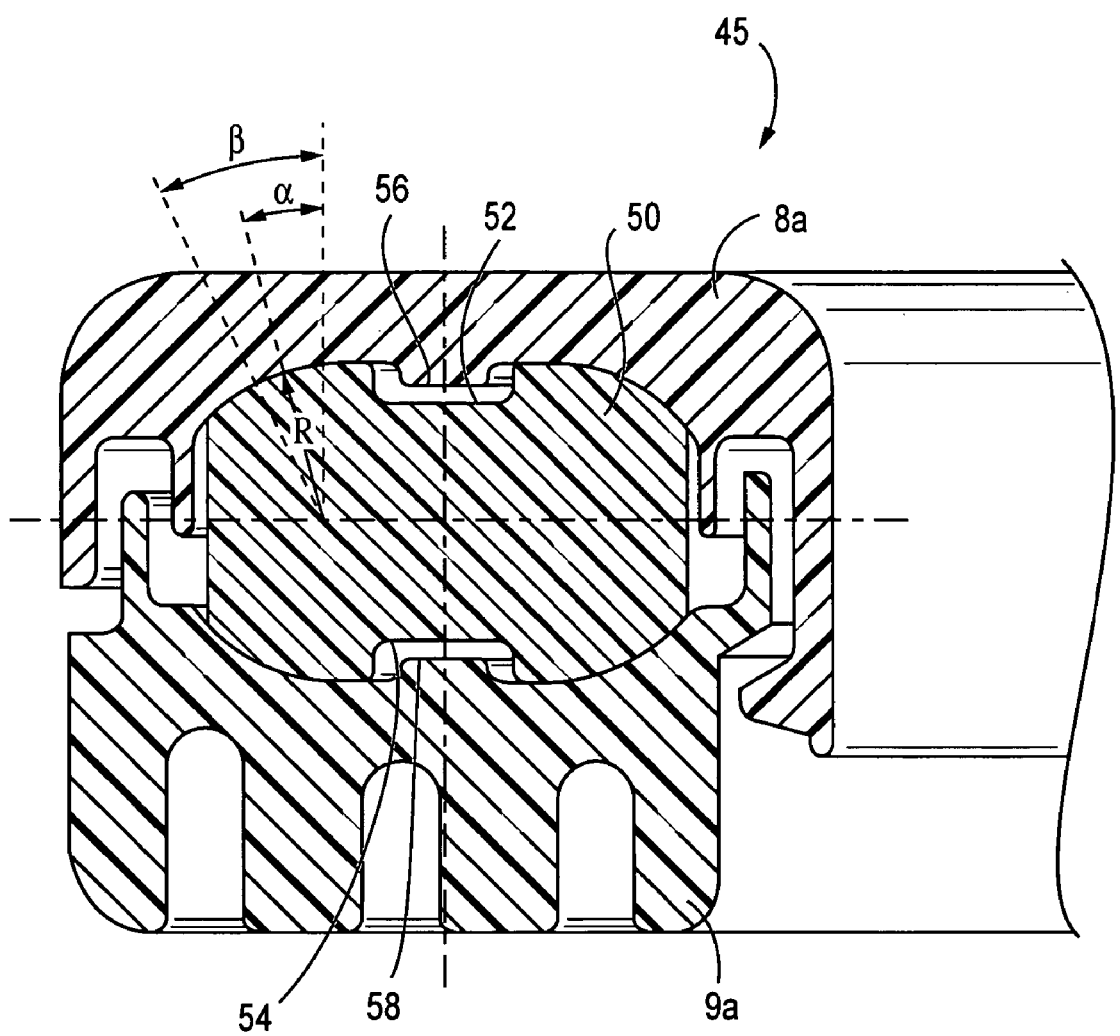

The fourth bearing 45 is depicted in FIGS. 10 and 11. It has a strut bearing upper casing (plastic cap) 8a and lower casing (plastic base) 9a similar to those in FIGS. 4–5, with modifications as follows. The prior art steel raceways and rolling elements have been replaced by a plastic ring 50. Said ring 50 is profiled to establish a line/arc contact bearing which is capable of supporting radial and axial loads. The contact is provided by the casings 8a and 9a and the ring 50 having a single radius R, over an angular range defined by $\alpha <$ contact angle $< \beta$.

The ring also has longitudinal grooves 52, 54 at its top and bottom surfaces to eliminate the possibility of contact in the center regions of the upper and lower casings 8a, 9a. This will keep the friction of the assembly low.

The upper and lower casings 8a, 9a have respective projections 56, 58 which project into the grooves 52, 54, respectively.

The ring also has recesses on its top and bottom sides as shown for example in FIGS. 12–14 which are used to carry lubrication. Said lubrication reduces friction and aids in the sealing of the bearing for improved lifetime.

The design is economical due to the elimination of steel raceways and balls. The parameters (i.e. R, $\alpha$ and $\beta$) can be adjusted in response to the desired axial and radial load capacity. The weight of the bearing is reduced while maintaining the fitting diameters prescribed by the mating components. The rolling action of the balls is replaced by a sliding action, which may be between two dissimilar plastic chemistries. The retained lubricant supplies sealing and continued lubrication through the life of the bearing.

Fifth Embodiment—Bearing with Spring Seat

A fifth bearing 55 is shown in FIGS. 12–14. As shown in FIG. 12, the bearing itself is shown fitted into a representative upper spring seat 1a corresponding to the upper spring seat 1 shown in FIG. 1. It is retained in the seat 1a by the use of plastic ears 56 on the lower bearing casing 9b which are snapped under rubber tabs 57 on the vulcanized steel spring seat 1a.

In FIG. 13, the bearing 55 is depicted in cross-section. FIG. 14 is a partly broken-away perspective view. It has a strut bearing upper casing or plastic cap 8 similar to that in FIGS. 4–5. The lower section or plastic base 9b is similar to that in FIGS. 4–5, with modifications as described above.

The prior art steel raceways and rolling elements have been replaced by a plastic ring 60. Said ring 60 is profiled to establish a four-point contact bearing at its top and bottom, inner and outer corners which is capable of supporting radial and axial loads. The ring also has central grooves 62, 64 formed in its top and bottom surfaces to eliminate contact where the ring 60 meets the upper and lower casings 8, 9b. This reduces the friction of the assembly.

The ring also has recesses 66, 68 on its top and bottom sides which are used to carry lubrication. Said lubrication reduces friction and aids in the sealing of the bearing for improved lifetime.

The weight of the bearing is reduced while maintaining the fitting diameters prescribed by the mating components. The rolling action of the balls is replaced by a sliding action, which may be between two dissimilar plastic chemistries. The retained lubricant supplies sealing and continued lubrication through the life of the bearing.

Sixth Embodiment

Figure 15:
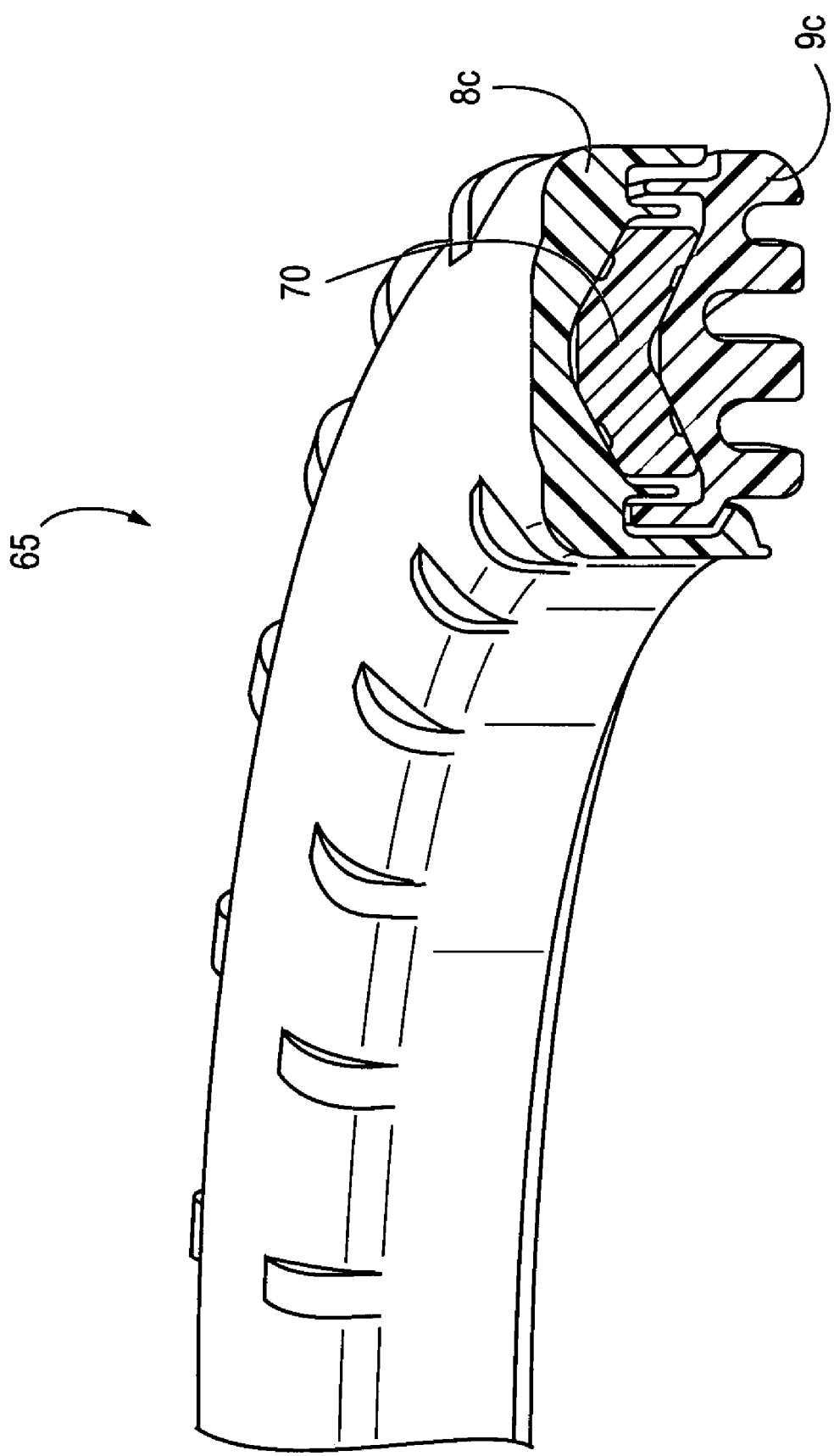
FIGS. 15 and 16 show a sixth embodiment of the invention, in a partially broken-away perspective view and a partial cross-section.
Figure 16:
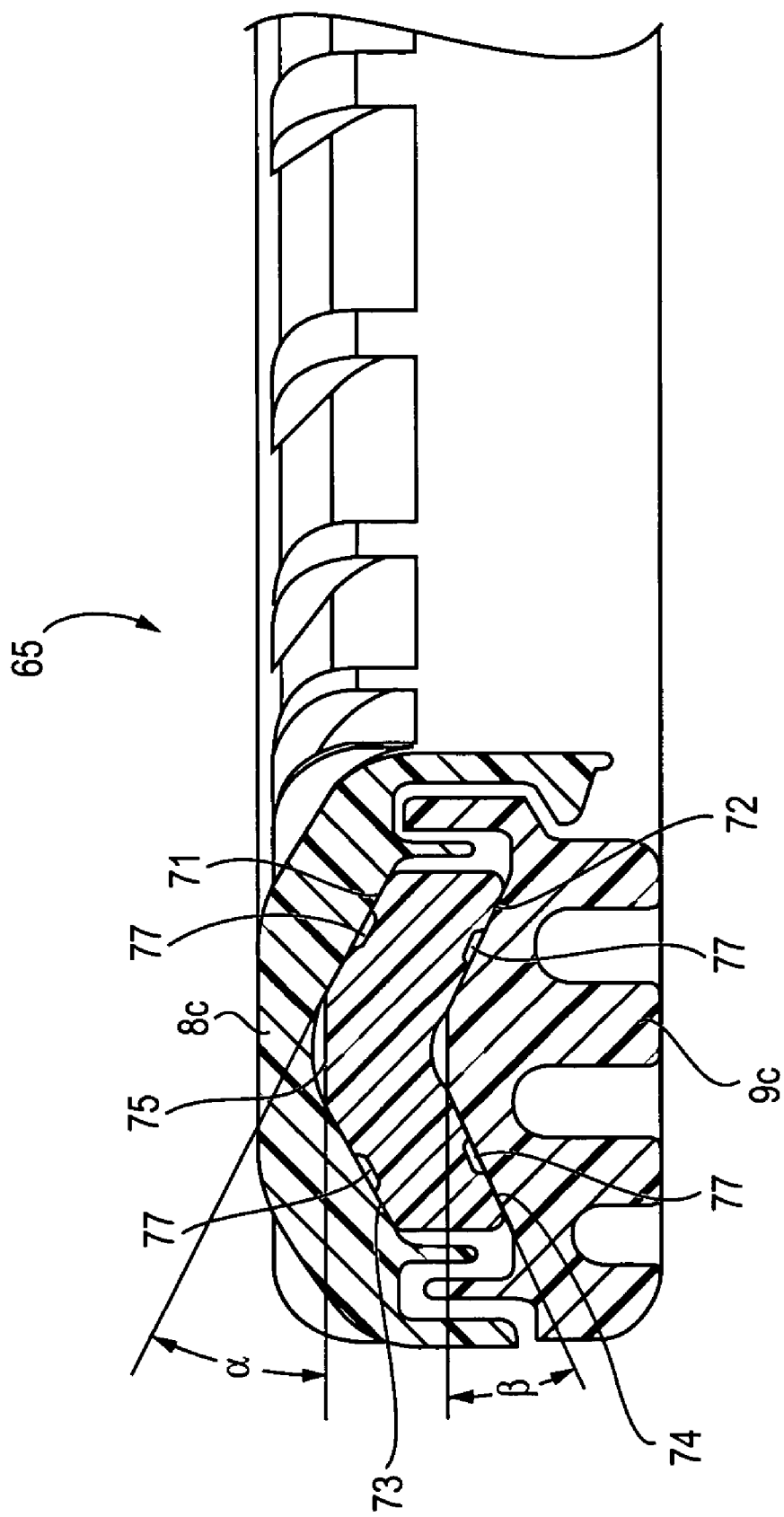

A sixth bearing is depicted in FIGS. 15 and 16. It has a strut bearing upper casing (plastic cap) 8c and lower casing (plastic base) 9c. The prior art steel raceways and rolling elements have been replaced by a plastic ring 70. Said ring 70 is generally V-shaped in cross-section and is profiled to establish a multiple-point contact bearing which is capable of supporting axial load. The upper, lower casings 8c, 9c and plastic ring 70 have substantially flat interfaces 71, 72, 73, 74 at their upper and lower, inner and outer regions. A flat central face 75 is formed on the top surface of the ring 70, forming an angle $\alpha$ with the interface 71 and an angle $180°-\alpha$ with the interface 73. A flat central face 76 is formed on the upper surface of the lower casing 9c, forming an angle $\beta$ with the interface 74 and an angle $180°-\beta$ with the interface 72. The flat surfaces 75, 76 form gaps between the ring 70 and the top and bottom casings 8c, 9c to eliminate contact at the central portions where the ring and the upper and lower casings meet. This will keep the friction of the assembly low.

Additional recessess 77 are formed in other respective surfaces of the ring 70 which carry lubrication and further reduce friction.

The ring also has recesses on its top and bottom sides as seen for example in FIGS. 12–14 which are used to carry lubrication. Said lubrication reduces friction and aids in the sealing of the bearing for improved lifetime.

The design is economical due to the elimination of steel raceways and balls. The design parameters, i.e. $\alpha$ and $\beta$, can be modified to improve axial and radial load capacity. $\alpha$ may be greater than $\beta$ as shown in FIG. 16, or $\alpha$ and $\beta$ may have another relationship.

The weight of the bearing is reduced while maintaining the fitting lines prescribed by the mating components. The rolling action of the balls is replaced by a sliding action, which may be between two dissimilar plastic chemistries. The retained lubricant supplies sealing and continued lubrication through the life of the Although the present invention has been described in relation to particular embodiments thereof, many other variations and modifications and other uses will become apparent to those skilled in the art. Therefore, the present invention is not limited by the specific disclosure herein.

What is claimed is:

1. A ring bearing, comprising:
an upper casing;
a lower casing; and
a plastic ring engaged between the upper and lower casings, thereby forming said ring bearing;
said upper and lower casings respectively defining upper and lower annular facing surfaces for engaging said plastic ring therebetween;
said upper and lower facing surfaces each having radially inner and outer portions;
said upper and lower facing surfaces each being substantially curved in a direction between said inner and outer portions thereof;
said plastic ring having upper and lower spacing portions, each being centrally located between said inner and outer portions of said upper and lower facing surfaces, thereby defining respective spaces oriented longitudinally of said ring between said plastic ring and said upper and lower facing surfaces which reduce contact friction with the respective facing surfaces.

2. A MacPherson strut having an upper spring seat, a spring, a strut tube, and a ring bearing disposed for engaging the spring seat, the spring and the strut tube; wherein the ring bearing comprises the ring bearing of claim 1.

3. The MacPherson strut of claim 2, further comprising additional grooves or recesses in the upper and/or lower surfaces of the plastic ring which further reduce contact friction with the respective facing surfaces of the upper and lower casings.

4. The MacPherson strut of claim 2, wherein said respective facing surfaces of said ring have at least in part a smaller radius of curvature than said facing surfaces of said casings.

5. The MacPherson strut of claim 2, wherein said respective facing surfaces of said ring have at least in part the same radius of curvature as said facing surfaces of said casings.

6. The MacPherson strut of claim 2, wherein said respective facing surfaces of said casings and said ring are engaged primarily at said inner and outer portions thereof.

7. The ring bearing of claim 1, further comprising additional grooves or recesses in the upper and/or lower surfaces of the plastic ring which further reduce contact friction with the respective facing surfaces of the upper and lower casings.

8. The ring bearing of claim 1, wherein said respective facing surfaces of said ring have at least in part a smaller radius of curvature than said facing surfaces of said casings.

9. The ring bearing of claim 1, wherein said respective facing surfaces of said ring have at least in part the same radius of curvature as said facing surfaces of said casings.

10. The ring bearing of claim 1, wherein said respective facing surfaces of said casings and said ring are engaged primarily at said inner and outer portions thereof.

11. The ring bearing of claim 1, wherein said spacing portion is defined by a flattened portion of said ring facing the corresponding said upper or lower facing surface.

12. The ring bearing of claim 1, wherein said spacing portion is defined by a groove formed in said ring facing the corresponding said upper or lower facing surface.

13. The ring bearing of claim 12, wherein one of said upper and lower facing surfaces has a respective projection which projects into the corresponding groove formed in the ring.

14. The ring bearing of claim 1, wherein said spacing portion is defined by a recess formed in said ring facing the corresponding said upper or lower facing surface.

15. A ring bearing, comprising:
an upper casing;
a lower casing; and
a plastic ring engaged between the upper and lower casings, thereby forming said ring bearing;
said upper and lower casings respectively defining upper and lower annular facing surfaces for engaging said plastic ring therebetween;
said upper and lower facing surfaces each having radially inner and outer portions;
wherein said ring has radially outer and inner portions which are relatively enlarged, in a direction between said upper and lower facing surfaces, with respect to a radially central portion thereof;
said plastic ring having a spacing portion, centrally located between said inner and outer portions of one of said upper and lower facing surfaces, thereby defining a respective space oriented longitudinally of said ring between said plastic ring and said one of said upper and lower facing surfaces which reduces contact friction with the respective facing surface.

16. The ring bearing of claim 15, wherein said spacing portion is defined by a flattened portion of said ring facing the corresponding said upper or lower facing surface.

17. The ring bearing of claim 15, wherein said spacing portion is defined by a groove formed in said ring facing the corresponding said upper or lower facing surface.

18. The ring bearing of claim 17, wherein said one of said upper and lower facing surfaces has a respective projection which projects into the corresponding groove formed in the ring.

19. The ring bearing of claim 15, wherein said spacing portion is defined by a recess formed in said ring facing the corresponding said upper or lower facing surface.

20. The ring bearing of claim 15, wherein said ring is generally dumbbell-shaped when seen in cross-section.

21. The ring bearing of claim 15, wherein said plastic ring has another spacing portion, centrally located between said inner and outer portions of the other one of said upper and lower facing surfaces, thereby defining a respective space oriented longitudinally of said ring between said plastic ring and said other one of said upper and lower facing surfaces which reduces contact friction with the respective central facing surface.

22. The ring bearing of claim 21, wherein the other one of said upper and lower facing surfaces has a respective projection which projects into the corresponding space between the facing surface and the ring.

23. A MacPherson strut having an upper spring seat, a spring, a strut tube, and a ring bearing disposed for engaging the spring seat, the spring and the strut tube; wherein the ring bearing comprises the ring bearing of claim 15.

24. A ring bearing, comprising:
an upper casing;
a lower casing; and
a plastic ring engaged between the upper and lower casings, thereby forming said ring bearing;
said upper and lower casings respectively defining upper and lower annular facing surfaces for engaging said plastic ring therebetween;
said upper and lower facing surfaces of said casings each having radially inner and outer portions;
wherein said inner and outer portions of each of said upper and lower facing surfaces have respective radially extending flat surfaces which together define a cross-sectional V-shape, and said plastic ring has a corresponding cross-sectional V-shape.

25. A MacPherson strut having an upper spring seat, a spring, a strut tube, and a ring bearing disposed for engaging the spring seat, the spring and the strut tube; wherein the ring bearing comprises the ring bearing of claim 24.

26. The ring bearing of claim 24, further comprising a friction-reducing recess formed extending longitudinally in said ring opposite a respective one of said inner and outer portions of said upper and lower facing surfaces.

27. The ring bearing of claim 26, wherein respective friction-reducing recesses are formed extending longitudinally in said ring opposite each of said inner and outer portions of said upper and lower facing surfaces.

28. A ring bearing, comprising:
an upper casing;
a lower casing; and
a plastic ring engaged between the upper and lower casings, thereby forming said ring bearing;
said upper and lower casings respectively defining upper and lower annular facing surfaces for engaging said plastic ring therebetween;
said upper and lower facing surfaces each having radially inner and outer portions;
wherein said inner and outer portions of each of said upper and lower facing surfaces have respective flat portions which together define a general V-shape when seen in cross-section, and said plastic ring has a corresponding cross-sectional V-shape;
said plastic ring having upper and lower spacing portions, each being centrally located between said inner and outer portions of said upper and lower facing surfaces, thereby defining respective spaces oriented longitudinally of said ring between said plastic ring and said upper and lower facing surfaces which reduce contact friction with the respective facing surfaces.

29. The ring bearing of claim 28, further comprising upper and lower spacing portions formed in said upper and lower facing surfaces, opposite said corresponding spacing portions formed in said ring.

30. A ring bearing, comprising:
an upper casing;
a lower casing; and
a plastic ring engaged between the upper and lower casings, thereby forming said ring bearing;
said upper and lower casings respectively defining upper and lower annular facing surfaces for engaging said plastic ring therebetween;
said upper and lower facing surfaces each having radially inner and outer portions;
wherein said inner and outer portions of each of said upper and lower facing surfaces have respective flat portions which together define a general V-shape when seen in cross-section, and said plastic ring has a corresponding cross-sectional V-shape;
wherein said upper and lower facing surfaces have respective upper and lower spacing portions, each being centrally located between said inner and outer portions of said upper and lower facing surfaces, thereby defining respective spaces oriented longitudinally of said ring between said plastic ring and said upper and lower facing surfaces which reduce contact friction with the respective facing surfaces.

* * * * *